United States Patent Office 2,999,866
Patented Sept. 12, 1961

2,999,866
EPOXIDES AND METHOD OF PREPARING
THE SAME
Paul S. Starcher, Charleston, and Samuel W. Tinsley,
South Charleston, W. Va., assignors to Union Carbide
Corporation, a corporation of New York
No Drawing. Filed Dec. 31, 1957, Ser. No. 706,303
4 Claims. (Cl. 260—348)

This invention relates to a novel series of synthetic organic chemical compounds and to a method of preparing them. More particularly, this invention is directed to new types of epoxides and has for an object the provision of new types of epoxides which are useful in the plastics and resins industry. The compounds of the invention are the 3,4-epoxycyclohexane-1,1-dimethanols and the dialkyl esters of 3,4-epoxycyclohexane-1,1-dimethanols and can be represented by the general formula:

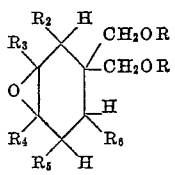

wherein R represents hydrogen atoms or acyl groups and $R_2$ through $R_6$ represent hydrogen atoms or alkyl groups. More particularly, R represents members selected from the groups consisting of hydrogen atoms and similar or dissimilar acyl groups containing from 1 to 18 carbon atoms and $R_2$ through $R_6$ represent members selected from the groups consisting of hydrogen atoms and lower alkyl groups. As used herein, the term "acyl" is intended to include saturated aliphatic carbonyl radicals containing from 1 through 18 carbon atoms, such as, for example, formyl, acetyl, propionyl, butyryl, isobutyryl, lauroyl and stearoyl groups.

However, the above definition should not be construed as limiting the invention since numerous types of esters, in addition to the dialkyl esters, of the 3,4-epoxycyclohexane-1,1-dimethanols will be found to be useful. Examples of the other types of esters include the cycloalkanoates, such as cyclohexane carboxylate, alkyl-substituted cyclohexane carboxylates, and cyclopentane carboxylate, the aralkanoates, such as phenylacetate and betaphenylpropionate, as well as the aromatic esters, such as benzoate, para-toluate and para-nonylbenzoate.

A preferred class of compounds to which this invention is directed are compounds represented by the structural formula set forth above, wherein $R_2$ through $R_6$ represent hydrogen or lower alkyl groups with the further provision that when any of the substituents $R_2$ through $R_6$ represent lower alkyl groups, the total number of carbon atoms in said lower alkyl groups does not exceed 12.

A particularly preferred subclass of compounds within the scope of this invention are those compounds represented by the structural formula set forth above, wherein the substituents $R_2$ and $R_6$ represent methyl groups and $R_3$, $R_4$ and $R_5$ are hydrogen.

The compounds of the invention have been found to be particularly adapted for use as plasticizers and stabilizers for synthetic organic resins and, more particularly, have been found suitable for use as plasticizers for the vinyl halide type polymers and copolymers.

The compounds of the invention are prepared by the reaction of peracetic acid and 3-cyclohexene-1,1-dimethanol or a 3-cyclohexene-1,1-dimethanol dialkanoate. The reaction whereby the compounds of this invention are prepared can be illustrated by the following general formula in the case of a 3-cyclohexene-1,1-dimethanol distearate:

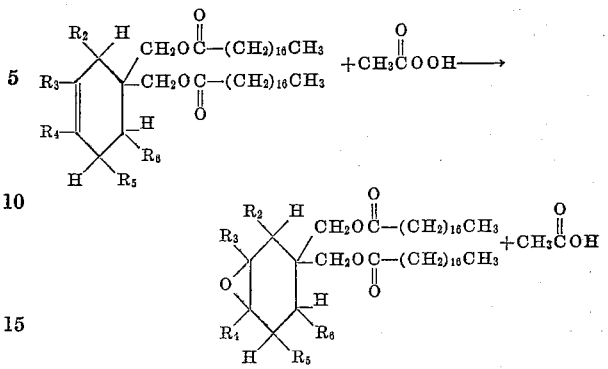

wherein the radicals $R_2$ through $R_6$ are as above defined.

The process of producing the compounds of the invention is carried out at temperatures in the range of from $-25°$ C. to $150°$ C. At lower temperatures, the rate of epoxidation is slow. At higher temperatures, the rate of epoxidation is faster, but precautions are necessary to prevent further reaction of the epoxy group. Temperatures in the range of from $10°$ C. to $90°$ C. are preferably used to provide a suitable reaction rate and to avoid undesired side reactions. The olefin starting material is conveniently charged to a reaction vessel and the theoretical quantity of peracetic acid is added. One or more mols of peracetic acid per mol of olefin is usually added to the olefin starting material. The reaction is allowed to proceed until approximately the theoretical amount of peracetic acid is consumed, which is readily determined by periodic tests for contained peracetic acid. The time of reaction is usually from about one to about ten hours, depending on the temperature employed. In working up the crude reaction product, it is preferred, although not absolutely necessary, to separate the acetic acid co-product from the epoxide as rapidly as possible, since it will react with the epoxide to form undesired glycols and glycol acetates, thus decreasing the overall yield of epoxide product. The reaction mixture can then be subjected to conventional recovery procedures for the recovery of the epoxide product. For example, the epoxide product can be recovered by extraction with a suitable solvent; continuous distillation; distillation under reduced pressure or a residue product may be taken.

The starting materials for the production of the epoxides of this invention are the corresponding olefinic materials which may be conveniently characterized by reference to the following general formula:

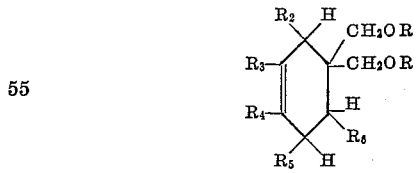

wherein the radicals R and $R_2$ through $R_6$ are as above defined. These olefinic starting materials are conveniently prepared by esterification of a selected 3-cyclohexene-1,1-dimethanol with two equivalents of a saturated aliphatic fatty acid. The 3-cyclohexene-1,1-dimethanols are obtained by the reaction of the corresponding 3-cyclohexenecarboxaldehyde (prepared by the Diels-Alder reaction of butadiene or a substituted butadiene with acrolein, crotonaldehyde, and the like) with excess formaldehyde in the presence of a base catalyst such as KOH as described by H. E. French and D. M. Gallagher in J.A.C.S., 64, 1497 (1942). A variety of cycloaliphatic aldehydes suitable for reaction with formaldehyde to form the corresponding 3-cyclohexene-1,1-dimethanols can be produced having alkyl substituents contained in the ring when compounds such as acrolein and crotonaldehyde are reacted with dienes such as butadiene, piperylene, isoprene, 2,3-dimethyl-1,3-pentadiene and the like.

The preferred 3-cyclohexene-1,1-dimethanols which contain alkyl groups attached to the cyclohexene ring are those with alkyl substituents having from 1 to 4 carbon atoms in the alkyl chain, such as, for example, methyl, ethyl, propyl, isopropyl, butyl, isobutyl and tertiary-butyl groups.

Particularly preferred 3-cyclohexene-1,1-dimethanols suitable for use in preparing the novel epoxy esters of this invention are 3-cyclohexene-1,1-dimethanol and the methyl substituted 3-cyclohexene-1,1-dimethanols which include representative compounds, such as, 6-methyl-3-cyclohexene-1,1-dimethanol. The saturated aliphatic fatty acids which are suitable for use in preparing the starting compounds include fatty acids, such as, acetic acid, propionic acid, butyric acid, n-valeric acid, isovaleric acid, caproic acid, enanthic acid, caprylic acid, pelargonic acid, capric acid, undecanoic acid, lauric acid, tridecanoic acid, myristic acid, palmitic acid, isopalmitic acid, heptadecanoic acid, and stearic acid.

The analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red end point with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solution and then titrated immediately with a 0.1 N aqueous sodium thiosulfate solution to a colorless endpoint. From the titration data thus obtained, a determination of epoxidant content can be made.

The following examples will serve to illustrate the practice of the invention.

EXAMPLE 1

*Preparation of 3,4-epoxycyclohexane-1,1-dimethanol diacetate*

3-cyclohexene-1,1-dimethanol 284 g. (2 mols) was refluxed in 200 cc. of toluene and acetic anhydride 460 g. (4.5 mols) added fast enough to maintain the temperature above 100° C. Reaction time was one hour at 117–120° C., with an additional hour at 120°. The reaction mixture was distilled to yield 371 g. of 3-cyclohexene-1,1-dimethanol diacetate having the following properties: color, water-white; acidity, nil; n 30/D, 1.4632; D 20/20, 1.0855; ester by saponification, 99.3 percent.

A solution of 1.71 mols of peracetic acid in ethyl acetate is added dropwise, with stirring, over a period of 80 minutes at a temperature in the range of from 50° C. to 55° C. to 355 grams of 3-cyclohexene-1,1-dimethanol diacetate. Stirring is continued for an additional 2 hours and 50 minutes, whereupon an analysis for peracetic acid indicated that 89.0 percent of the peracetic acid charged to the reaction had been consumed. The reaction mixture is then stored at a temperature of −11° C. for a period of 16 hours, after which time the reaction mixture is passed through a steam stripper to remove ethyl acetate, acetic acid and low-boiling components. The residue is added slowly to a dry, hot kettle, maintained at a temperature of about 250° C. under vacuum and flash distilled. The flash-distilled product is then redistilled on an 8-inch metal packed column under high vacuum and there is obtained 278 grams of a product having a boiling point of 115° C. at 0.55 mm. Hg pressure absolute, an index of refraction ($n_C{}^{30}$) of 1.4662, and a purity of 98.4 percent, as determined by a titration for epoxide by the pyridine hydrochloride method.

EXAMPLE 2

*Preparation of 3,4-epoxycyclohexane-1,1-dimethanol distearate*

3-cyclohexene-1,1-dimethanol, 71 g., stearic acid, 308 g., and 0.6 g. of tetrabutyl titanate catalyst were refluxed in toluene and the water removed by means of a decanter. Reaction was complete in 7 hours at 169–187° C. The reaction mixture was vacuum stripped to 300° C. at 1 mm. to yield 329 g. of residue product. The 3-cyclohexene-1,1-dimethanol distearate thus prepared was a tan-colored wax; M.P. 45–47° C.; acidity, 0.024 cc. N base/g.; ester by saponification, 101.6 percent.

A solution of 0.5 mol of peracetic acid in ethyl acetate is added, with stirring, over a period of 30 minutes at a temperature of 50° C. to 297 grams of 3-cyclohexene-1,1-dimethanol distearate. Stirring is continued for an additional 45 minutes, whereupon an analysis indicated that 86.0 percent of the peracetic acid charged to the reaction had been consumed. The reaction mixture is then stored at a temperature of −11° C. for a period of 20 hours and there is obtained a solid product which, when recrystallized from acetone, provides 282 grams of a white solid having a melting point of from 39° C. to 40° C. and a purity of 80.1 percent as 3,4-epoxycyclohexane-1,1-dimethanol distearate.

In an analogous manner, as described in Examples 1 and 2, other saturated aliphatic hydrocarbon esters of 3,4-epoxycyclohexane-1,1-dimethanol are readily prepared and include 3,4-epoxycyclohexane-1,1-dimethanol dipropionate;
3,4-epoxycyclohexane-1,1-dimethanol divalerate;
3,4-epoxycyclohexane-1,1-dimethanol dicaprylate;
3,4-expoxycyclohexane-1,1-dimethanoldipelargonate;
3,4-epoxycyclohexane-1,1-dimethanol dicaprate;
3,4-epoxycyclohexane-1,1-dimethanoldimyristate;
3,4-epoxycyclohexane-1,1-dimethanol dipalmitate;
3,4-epoxy-6-methylcyclohexane-1,1-dimethanol dilaurate;
3,4-epoxy-6-methylcyclohexane-1,1-dimethanol divalerate;
3,4 - epoxy - 6 - methylcyclohexane - 1,1 - dimethanol dimyristate.

EXAMPLE 3

*Preparation of 3,4-epoxycyclohexane-1,1-dimethanol*

A solution (328 grams) of a 25.4 percent peracetic acid (1.1 mols) in ethyl acetate is added, with stirring, over a period of 1 hour at a temperature of 40° C. to 142 grams (1 mol) of 3-cyclohexene-1,1-dimethanol. Stirring is continued for an additional .5 hour, whereupon an analysis for peracetic acid indicates that the reaction is substantially complete. The reaction mixture is fed dropwise to a still-kettle containing ethylbenzene under reflux at such a pressure as to maintain a kettle temperature of 40° C. Ethyl acetate, acetic acid and ethylbenzene are removed continuously. After the addition is complete, the kettle material is stripped of volatiles to a temperature of 50° C. at 1 mm. of Hg pressure absolute.

The residue product, 3,4-epoxcyclohexane-1,1-dimethanol, is a pale yellow material characterized by an oxirane oxygen content of 9.0 percent.

What is claimed is:
1. As a new epoxide, 3,4-epoxcyclohexane-1,1-dimethanol diacetate.
2. As a new epoxide, 3,4-epoxycyclohexane-1,1-dimethanol distearate.
3. As a new epoxide, 3,4-epoxycyclohexane-1,1-dimethanol.
4. Compounds of the formula:

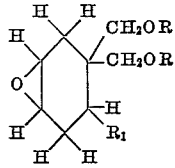

wherein $R_1$ represents a member selected from the group consisting of hydrogen and methyl and R represents members selected from the group consisting of hydrogen and the group

wherein $R_2$ is a member selected from the group consisting of hydrogen and alkyl groups of from 1 through 17 carbon atoms.

References Cited in the file of this patent
UNITED STATES PATENTS
2,794,029    Phillips et al. _____ May 28, 1957
FOREIGN PATENTS
653,351      Great Britain _____ May 16, 1951

Notice of Adverse Decision in Interference

In Interference No. 92,882 involving Patent No. 2,999,866, P. S. Starcher and S. W. Tinsley, Epoxides and method of preparing the same, final judgment adverse to the patentees was rendered Apr. 2, 1964, as to claim 4.

[*Official Gazette October 27, 1964.*]